United States Patent
Picard et al.

(10) Patent No.: US 7,993,513 B2
(45) Date of Patent: Aug. 9, 2011

(54) TWO-STEP PROCESS FOR DESULPHURIZING OLEFINIC GASOLINES COMPRISING ARSENIC

(75) Inventors: Florent Picard, Bretteville du Grand Cause (FR); Vincent Coupard, Vauls-en-Velin (FR); Elodie Devers, Lyons (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 485 days.

(21) Appl. No.: 12/270,194

(22) Filed: Nov. 13, 2008

(65) Prior Publication Data
US 2009/0139901 A1 Jun. 4, 2009

(30) Foreign Application Priority Data
Nov. 19, 2007 (FR) ..................... 07 08155

(51) Int. Cl.
*C10G 45/00* (2006.01)
(52) U.S. Cl. ............ 208/253; 208/208 R; 208/209; 208/213; 208/215; 208/216 R; 208/217; 208/251 H; 208/251 R; 208/89; 208/91; 208/211
(58) Field of Classification Search ............ 208/89, 208/91, 208 R, 209, 211, 213, 215, 216 R, 208/217, 251 H, 251 R, 253
See application file for complete search history.

(56) References Cited

FOREIGN PATENT DOCUMENTS

| EP | 59056241 | | 3/1984 |
|----|----------|---|--------|
| FR | 2 673 191 | A | 8/1992 |
| JP | 60 202190 | A | 10/1985 |
| JP | 60202190 | * | 10/1985 |
| WO | WO 2004/101713 | A | 11/2004 |

* cited by examiner

*Primary Examiner* — Robert J Hill, Jr.
*Assistant Examiner* — Brian McCaig
(74) *Attorney, Agent, or Firm* — Millen, White, Zelano & Branigan, P.C.

(57) ABSTRACT

The invention concerns a fixed bed process for capturing arsenic and for desulphurizing a hydrocarbon fraction comprising olefins, sulphur and arsenic, said process comprising a step a) for bringing a capture mass into contact with said hydrocarbon fraction in the presence of hydrogen, the ratio between the flow rate of hydrogen and the flow rate of the hydrocarbon fraction being in the range 50 to 800 $Nm^3/m^3$, the operating temperature being in the range 200° C. to 400° C., the operating pressure being in the range 0.2 to 5 MPa. The capture mass comprises molybdenum in a sulphurized form, nickel in a sulphurized form and at least one porous support selected from the group constituted by aluminas, silica, silica-aluminas, titanium oxide and magnesium oxide. The nickel content is in the range 10% to 28% by weight and the molybdenum content is in the range 0.3% to 2.1% by weight.

20 Claims, No Drawings

TWO-STEP PROCESS FOR DESULPHURIZING OLEFINIC GASOLINES COMPRISING ARSENIC

FIELD OF THE INVENTION

The production of low sulphur gasoline necessitates a hydrodesulphurization process which conventionally comprises bringing sulphur-containing compounds contained in the gasoline into contact with a gas which is rich in hydrogen. The octane number of such a gasoline is very strongly linked to its olefins content. In order to preserve the octane number of the gasoline, olefin hydrogenation reactions have to be limited. Processes for selective hydrodesulphurization of olefinic gasoline were thus developed during the 1990s to allow refiners to comply with future specifications regarding fuels.

In such processes, in order to keep the degree of conversion of the sulphur-containing compounds high, the used catalysts are regularly replaced by fresh catalyst. Deactivation of hydrotreatment catalysts is usually linked to the presence of impurities present in the treated gasoline. Thus, the presence of heavy metals such as mercury or arsenic, or contaminants such as silicon in the form of organometallics in the gasoline causes rapid deactivation of the hydrotreatment catalysts.

Various solutions have been proposed for extracting the arsenic present in a gasoline comprising olefins and sulphur-containing compounds. However, none of those solutions is suitable for capturing arsenic from said gasoline and for desulphurizing said gasoline while limiting hydrogenation reactions.

PRIOR ART

U.S. Pat. No. 6,759,364 describes a catalyst which is suitable for the capture of arsenic in naphtha cuts or distillate from the distillation of crude oil containing nickel, molybdenum and phosphorus. The nickel and molybdenum contents are more than 8% by weight, and the phosphorus content is in the range 0.1% to 3% by weight. The solution presented in the context of the present invention differs from that presented in U.S. Pat. No. 6,759,364 in particular by the fact that the amount of group VIB element is in the range 0.3% to 2.1% by weight.

US patent application 2003 111391 describes a catalyst which is suitable for the capture of arsenic in hydrocarbon cuts comprising a refractory support, at least 8% by weight of a group VIB element selected from molybdenum and tungsten and a quantity of a group VIII element selected from nickel and cobalt such that the mole ratio between the group VIII element and the group VIB element is in the range 1.5 to 2.5. The solution presented in the context of the present invention differs from that presented in this patent application in particular in that the quantity of group VIB element is in the range 0.3% to 2.1% by weight.

SUMMARY OF THE INVENTION

The invention concerns a fixed bed process for capturing arsenic and for desulphurizing a hydrocarbon fraction comprising olefins, sulphur and arsenic, said process comprising a step a) for bringing a capture mass into contact with said hydrocarbon fraction in the presence of hydrogen, the ratio between the flow rate of hydrogen and the flow rate of the hydrocarbon fraction being in the range 50 to 800 $Nm^3/m^3$, the operating temperature being in the range 200° C. to 400° C., the operating pressure being in the range 0.2 to 5 MPa. The capture mass comprises molybdenum in a sulphurized form, nickel in a sulphurized form and at least one porous support selected from the group constituted by aluminas, silica, silica-aluminas, titanium oxide and magnesium oxide. The nickel content is in the range 10% to 28% by weight and the molybdenum content is in the range 0.3% to 2.1% by weight.

DETAILED DESCRIPTION OF THE INVENTION

The aim is to obtain a good compromise between the hydrodesulphurization activity, the HDS/HDO (hydrodesulphurization/oxygen hydrogenation) selectivity and the capture of arsenic on the capture mass.

The invention concerns a fixed bed process for the capture of arsenic and for desulphurizing a hydrocarbon fraction comprising olefins, sulphur and arsenic. The process comprises a step a) for bringing a capture mass into contact with said hydrocarbon fraction in the presence of hydrogen. The ratio between the flow rate of the hydrogen and the flow rate of the hydrocarbon fraction is in the range 50 to 800 $Nm^3/m^3$, preferably in the range 100 to 600 $Nm^3/m^3$, and more preferably in the range 200 to 400 $Nm^3/m^3$. The operating temperature is in the range 200° C. to 400° C., preferably in the range 240° C. to 350° C. The operating pressure is in the range 0.2 to 5 MPa, preferably in the range 0.5 MPa to 3 MPa.

The capture mass comprises:
 molybdenum in a sulphurized form and nickel in a sulphurized form;
 at least one porous support selected from the group constituted by aluminas, silica, silica-aluminas, titanium oxide, magnesium oxide, and preferably by alumina and silica-aluminas.

The nickel content is in the range 10% to 28% by weight, expressed as a % of nickel oxide on the capture mass before sulphurizing. The molybdenum content is in the range 0.3% to 2.1% by weight, expressed as the % of molybdenum oxide on the capture mass before sulphurizing.

Step a)

The values given in ppm or ppb in this description are ppm and ppb expressed by weight; 1000 ppb=1 ppm.

The term "mono-olefins", normally termed alkenes, designates hydrocarbon molecules having a single double bond.

The invention preferably applies to the treatment of cracked gasoline cuts derived from catalytic cracking units, thermal cracking units or steam cracking units. The gasoline is generally a hydrocarbon cut the boiling point range of which extends from the boiling points of hydrocarbons containing 5 carbon atoms up to about 250° C.

The invention also applies to the treatment of gasoline mixtures from straight run distillation which may contain heavy metals derived from the crude, with cracking gasolines containing olefins.

Preferably, the hydrocarbon fraction is a catalytically cracked gasoline containing between 5% and 60% by weight of olefins, between 50 ppm and 6000 ppm by weight of sulphur and between 10 ppb and 1000 ppb by weight of arsenic.

In the context of the present invention, the degree of hydrogenation of the olefins during capture step a) is less than 50%, preferably less than 30% and more preferably less than 20%.

In order to be active in capturing arsenic-containing compounds, the capture mass must generally be employed under operating conditions such that the rate of capture of the arsenic is maximized, while limiting the olefin hydrogenation rate.

The hydrogen used may be derived from any hydrogen source. Preferably, fresh hydrogen is used which is derived from the refinery and/or hydrogen recycled from a hydrodesulphurization unit, preferably from the hydrodesulphurization unit for the hydrocarbon cut to be purified.

The operating temperature of the reactors is generally in the range 200° C. to 400° C., preferably in the range 240° C. to 350° C., and more preferably in the range 260° C. to 340° C.

The pressure is generally in the range 0.2 MPa to 5 MPa and preferably in the range 0.5 MPa to 3 MPa.

The quantity of capture mass to be used is generally calculated as a function of the amount of contaminants of the feed, the desired service life and the maximum amount of "capture agent" on the solid.

The specific surface area of the support is generally in the range 30 $m^2$/gram to 350 $m^2$/gram, preferably in the range 60 $m^2$/gram to 200 $m^2$/gram, more preferably in the range 79 $m^2$/gram to 140 $m^2$/gram.

In a variation, the capture mass comprises phosphorus, the phosphorus content being in the range 0.1% to 10% by weight, expressed as a % of phosphorus oxide on the capture mass before sulphurizing.

Step b)

Step a) is generally followed by a selective hydrodesulphurization step b). In fact, step a) can transform a portion of the organic sulphur-containing compounds into $H_2S$. However, when the effluent from step a) has a sulphur content of more than 10 ppm, the gasoline which is free of arsenic is treated in this selective hydrodesulphurization step b), in order to produce a gasoline with a low sulphur content which satisfies current specifications. During step b), the effluent from step a) is brought into contact with a selective hydrodesulphurization catalyst.

The catalyst employed in step b) is generally protected from the arsenic present in the feed by the capture mass employed in step a). Thus, highly selective hydrodesulphurization catalysts which are sensitive to the presence of arsenic may be used in step b).

Any hydrodesulphurization catalyst may be used in step b). However, it is preferable to use catalysts with good selectivity as regards the hydrodesulphurization reactions. Such catalysts generally comprise at least one amorphous mineral, porous support, a group VIB metal, and a group VIII metal. The group VIB metal is generally molybdenum or tungsten and the group VIII metal is generally nickel or cobalt.

The support is generally selected from the group constituted by aluminas, silica, silica-aluminas, silicon carbide, titanium oxides used alone or as a mixture with alumina or silica-alumina, and magnesium oxides used alone or as a mixture with alumina or silica-alumina. Preferably, the support is selected from the group constituted by aluminas, silica and silica-aluminas.

In the case in which steps a) and b) are in a sequence, it is advantageous to operate the two steps under the same pressure, temperature and hydrogen flow rate conditions.

In a variation, the capture mass is placed in position as a guard bed for the hydrodesulphurization reactor in which step b) takes place.

In another variation, step a) is carried out in a separate capture reactor and placed upstream of the hydrodesulphurization reactor in which step b) takes place.

The process for preparing the capture mass is in no case a limiting element of the present invention.

The capture mass of the invention may be prepared using any technique which is known to the skilled person.

It is generally prepared using the dry impregnation method which consists of dissolving exactly the desired quantity of metallic elements in the form of soluble salts in a selected solvent, for example demineralized water, and to fill the pores of the support as precisely as possible using the prepared solution.

The solid obtained thereby may undergo a drying step and/or a calcining step and/or a reduction step. Next, it generally undergoes a sulphurizing step. Preferably, the solid undergoes a drying step optionally followed by a calcining step.

Generally, sulphurizing is carried out by treating the capture mass in contact with hydrogen at a temperature and with a decomposable organic sulphur-containing compound which can generate $H_2S$, such as DMDS (dimethyldisulphide), or in direct contact with a gaseous stream of $H_2S$ and hydrogen.

This step is carried out either inside (in situ) or outside the reaction unit (ex situ) at temperatures in the range 100° C. to 600° C., preferably in the range 200° C. to 500° C., or even in the range 300° C. to 450° C.

In a variation, sulphurizing of the capture mass is carried out during capture of the heavy metals. Thus, the capture mass is charged in the oxide form and the hydrocarbon fraction to be treated, by partial decomposition of the sulphur-containing compounds which it contains, generates $H_2S$ which can sulphurize the capture mass, transforming the metallic oxides into metallic sulphides.

The process may be carried out in any type of reactor which is known to the skilled person. The operation facilitates application of the principle and the mass without modifying the intrinsic performances, but simply by optimizing the service life.

Example 1

Preparation of Solids

In the following examples, the specific surface area of the support was measured using the BET method (standard ASTM D3663). The pore volume was measured by mercury porosimetry using the standard ASTM D4284-92 with a wetting angle of 140°.

The capture masses of the invention were prepared by successive impregnations. The nickel was deposited by double dry impregnation of an aqueous solution prepared from nickel nitrate, the volume of the solution containing the metal being equal to the pore volume of the mass of the support. For the capture mass A (not in accordance), only this nickel impregnation step was carried out.

The supports used were transition aluminas having a specific surface area of 135 $m^2$/g and a pore volume of 1.12 $cm^3$/g.

The concentrations of precursors of the aqueous solution were adjusted so as to deposit the desired amounts by weight on the support.

The solid was then dried for 12 hours at 120° C. and calcined in air at 500° C. for 2 hours.

In the case of capture masses containing molybdenum (mass B and C), this is deposited in a second step by dry impregnation of an aqueous solution prepared from ammonium heptamolybdate, the volume of the solution containing the metal being rigorously equal to the pore volume of the support mass. The concentrations of precursors in the aqueous solution were adjusted so as to deposit the desired amounts by weight on the support. The solid was then dried for 12 hours at 120° C. and calcined in air at 500° C. for 2 hours.

The amount of metallic oxides in the capture masses are described in Table 1.

The selective hydrodesulphurization catalyst (catalyst D) is a selective hydrodesulphurization catalyst comprising 10.3% by weight of molybdenum oxide and 2.9% by weight of cobalt oxide. The support used is a transition alumina having a (specific surface area, pore volume) couple of (135 m$^2$/g, 1.12 cm$^3$/g).

The amounts of metallic oxides of this catalyst are described in Table 1.

TABLE 1

Description of solids

| Solid | % NiO | % MoO$_3$ | % CoO |
|---|---|---|---|
| Capture mass A (not in accordance) | 18.5 | — | — |
| Capture mass B (in accordance with the invention) | 18.2 | 1.8 | — |
| Capture mass C (not in accordance) | 7.7 | 7.4 | — |
| Catalyst D (reference) | — | 10.3 | 2.9 |

Example 2

Arsenic Capture Mass

The arsenic capture test was carried out on capture masses charged with successive fixed beds inside a tubular reactor. In this case we were interested in the capture mass placed in the attack bed (i.e. on the first bed of successive fixed beds), in order to study its saturation. A catalytically cracked (FCC) gasoline containing arsenic and with the compositional characteristics shown in Table 2 was injected so as to percolate through the various beds charged into the reactor.

TABLE 2

Characteristics of FCC gasoline cut

| As, ppm | 15 |
| S ppm | 200 |
| Aromatics, % by weight | 18.27 |
| Paraffins and naphthenes (% by weight) | 50.76 |
| Olefins, wt % | 30.95 |
| IP, ° C. | 54 |
| EP, ° C. | 168 |

The operating conditions were as follows:
P=2.0 MPa;
H$_2$/feed=300 normal litres/litre of hydrocarbon feed;
HSV=4 h$^{-1}$;
T=260° C.

The capture masses were charged in the pre-sulphurized state. Activation of the capture masses was carried out in hydrogen at 250° C. with a flow rate of 1.2 normal litres of hydrogen per gram of catalyst.

Arsenic capture was monitored by measuring the arsenic content in the liquid effluents. The arsenic was analyzed by atomic absorption spectrometry (graphite furnace). The test was finished when the arsenic had broken through, i.e. it was detected in an analytical manner in the effluents.

The capture masses were then discharged. The quantity by weight of arsenic captured by the solid was determined by X ray fluorescence.

The capture masses were prepared in accordance with Example 1. Their contents by weight in the active phase with respect to the molybdenum oxide and nickel oxide as well as the quantity of arsenic captured as a percentage by weight are given in Table 3.

TABLE 3

Characteristics of capture masses and quantity of arsenic.

| | Wt % NiO | Wt % MoO$_3$ | Wt % CoO | Wt % As captured |
|---|---|---|---|---|
| Capture mass A (not in accordance) | 18.5 | — | — | 12.1 |
| Capture mass B (in accordance with the invention) | 18.2 | 2.1 | — | 14.8 |
| Capture mass C (not in accordance) | 7.7 | 7.4 | — | 10.2 |
| Catalyst D (reference) | — | 10.3 | 2.9 | 2.1 |

Capture mass B captured 14.8% by weight of arsenic, i.e. more than the 12.1% by weight for reference capture mass A and than the 10.2% by weight for capture mass C.

Example 4

Activity and Selectivity Test

In order to evaluate the catalytic performances for hydrodesulphurization (HDS) and HDS/HDO (hydrodesulphurization/olefin hydrogenation) selectivity, a model charge was used which was representative of a catalytically cracked gasoline (FCC) containing 10% by weight of 2,3-dimethyl-but-2-ene and 0.33% by weight of 3-methylthiophene (i.e. 1000 ppm of sulphur with respect to the feed). The solvent used was heptane. The capture masses were pre-sulphurized ex situ in the gas phase at 500° C. for 2 h in a stream of H$_2$S in H$_2$ (15%).

The reaction was carried out in a closed Grignard type reactor under a pressure of 3.5 MPa of hydrogen, at 250° C. The feed described above and the catalyst were introduced into this reactor. Samples were taken at various time intervals and were analyzed by gas chromatography in order to observe the disappearance of the reagents and the consequential appearance of the products.

The activity was expressed as the rate constant kHDS for the hydrodesulphurization reaction (HDS) normalized to the volume of solid in the oxide form, assuming 1$^{st}$ order with respect to the sulphur-containing compounds. The selectivity was expressed as the normalized ratio of the rate constants, kHDS/kHDO, kHDO being the rate constant for the olefin hydrogenation reaction (HDO), normalized per volume of solid in the oxide form, assuming 1$^{st}$ order with respect to the olefins.

The values were normalized by taking the catalyst D as the reference and taking kHDS/kHDO=100 and kHDS=100.

| Catalyst | NiO wt % | MoO$_3$ wt % | CoO wt % | $K_{HDS}/k_{HDO}$ | $K_{HDS}$ |
|---|---|---|---|---|---|
| D (reference) | — | 10.3 | 2.9 | 100 | 100 |

The catalytic performances of the capture masses in terms of HDS activity and HDS/HDO selectivity normalized with respect to the reference catalyst D are given in Table 4. The quantity of arsenic captured by each solid is also shown.

TABLE 4

Performances of capture masses on model feed

|  | % NiO | % MoO$_3$ | % CoO | Normalized HDS activity | Normalized selectivity | As captured, wt % |
|---|---|---|---|---|---|---|
| Capture mass A (not in accordance) | 18.5 | 0 | — | 21 | 406 | 12.1 |
| Capture mass B (in accordance with the invention) | 18.2 | 2.1 | — | 57 | 169 | 14.8 |
| Capture mass C (not in accordance) | 7.7 | 7.4 | — | 108 | 88 | 10.2 |
| Catalyst D (reference) | — | 10.3 | 2.9 | 100 | 100 | 2.1 |

Capture mass A was significantly less active than the reference catalyst D with only 21% of its HDS activity. It was much more selective than reference catalyst D, the selectivity being multiplied by a factor of 4.

Capture mass B was less active than reference catalyst D with 57% of its HDS activity. It was also more selective than catalyst D, with 1.7 times the reference selectivity. This solid thus results in a better compromise between arsenic capture, HDS activity and HDS/HDO selectivity.

The capture mass C was slightly more active than reference catalyst D with 108% of its HDS activity. It was less selective than the reference catalyst D, its selectivity being multiplied by a factor of 0.88.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 07/08.155, filed Nov. 19, 2007 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A fixed bed process for capturing arsenic and for desulphurizing a hydrocarbon fraction comprising olefins, sulphur and arsenic, said process comprising a step a) for bringing a capture mass into contact with said hydrocarbon fraction in the presence of hydrogen, said capture mass comprising:
    molybdenum in a sulphurized form and nickel in a sulphurized form;
    at least one porous support selected from any of aluminas, silica, silica-aluminas, titanium oxide and magnesium oxide;
the nickel content being in the range 10% to 28% by weight expressed as the percentage of nickel oxide on the capture mass before sulphurizing, the molybdenum content being in the range 0.3% to 2.1% by weight, expressed as the percentage of molybdenum oxide on the capture mass before sulphurizing.

2. A process according to claim 1, comprising a step b) in which hydrocarbon effluent from step a) is brought into contact with a selective hydrodesulphurization catalyst.

3. A process according to claim 2, in which the selective hydrodesulphurization catalyst comprises a group VIB metal, a group VIII metal, at least one support selected from any of aluminas, silica, silica-aluminas, silicon carbide, titanium oxides, a mixture of a titanium oxide with alumina or silica-alumina, and magnesium oxides a mixture of a magnesium oxide with alumina or silica-alumina.

4. A process according to claim 2, wherein the hydrocarbon effluent from step a) has a sulphur content of more than 10 ppm.

5. A process according to claim 2, in which the hydrocarbon fraction is a catalytically cracked gasoline containing between 5% and 60% by weight of olefins, between 50 ppm and 6000 ppm by weight of sulphur and between 10 ppb and 1000 ppb by weight of arsenic.

6. A process according to claim 5, in which said porous support is an alumina or silica-alumina.

7. A process according to claim 6, in which the specific surface area of said porous support is in the range 30 m$^2$/gram to 350 m$^2$/gram.

8. A process according to claim 7, in which the selective hydrodesulphurization catalyst comprises a group VIB metal, a group VIII metal, at least one support selected from any of aluminas, silica, silica-aluminas, silicon carbide, titanium oxides, a mixture of a titanium oxide with alumina or silica-alumina, and magnesium oxides a mixture of a magnesium oxide with alumina or silica-alumina.

9. A process according to claim 8, in which in step a), operating conditions comprise a ratio between hydrogen flow rate and flow rate of the hydrocarbon fraction is in the range of 50 to 800 Nm$^3$/m$^3$, operating temperature is in the range of 200° C. to 400° C. and operating pressure is in the range of 0.2 to 5 MPa.

10. A process according to claim 9, in which in step a), the ratio between the flow rate of hydrogen and the flow rate of the hydrocarbon fraction is in the range of 100 to 600 Nm$^3$/m$^3$, the operating temperature is in the range of 240° C. to 350° C. and the operating pressure is in the range of 0.5 to 3 MPa.

11. A process according to claim 10, wherein during step (a) olefins are hydrogenated to a degree less than 20%.

12. A process according to claim 1, in which the hydrocarbon fraction is a catalytically cracked gasoline containing between 5% and 60% by weight of olefins, between 50 ppm and 6000 ppm by weight of sulphur and between 10 ppb and 1000 ppb by weight of arsenic.

13. A process according to claim 1, in which said porous support is an alumina or silica-alumina.

14. A process according to claim 1, in which the specific surface area of said porous support is in the range 30 m²/gram to 350 m²/gram.

15. A process according to claim 1, in which the capture mass further comprises phosphorus, the phosphorus content being in the range 0.1% to 10% by weight, expressed as the percentage of phosphorus oxide on the capture mass before sulphurizing.

16. A process according to claim 1, in which in step a), is conducted under operating conditions comprising a ratio between hydrogen flow (Nm³) and flow of the hydrocarbon fraction (m³) is in the range of 50 to 800 Nm³/m³, an operating temperature is in the range of 200° C. to 400° C. and an operating pressure is in the range of 0.2 to 5 MPa.

17. A process according to claim 16, in which in step a), the ratio between the flow of hydrogen and the flow of the hydrocarbon fraction is in the range of 100 to 600 Nm³/m³, the operating temperature is in the range of 240° C. to 350° C. and the operating pressure is in the range of 0.5 to 3 MPa.

18. A process according to claim 1, wherein during step (a) olefins are hydrogenated to a degree less than 50%.

19. A process according to claim 1, wherein during step (a) olefins are hydrogenated to a degree less than 30%.

20. A process according to claim 1, wherein during step (a) olefins are hydrogenated to a degree less than 20%.

* * * * *